Dec. 16, 1952 L. P. CROSET 2,621,493
FLEXIBLE COUPLING, DAMPER, AND THE LIKE
Filed March 15, 1948 2 SHEETS—SHEET 2
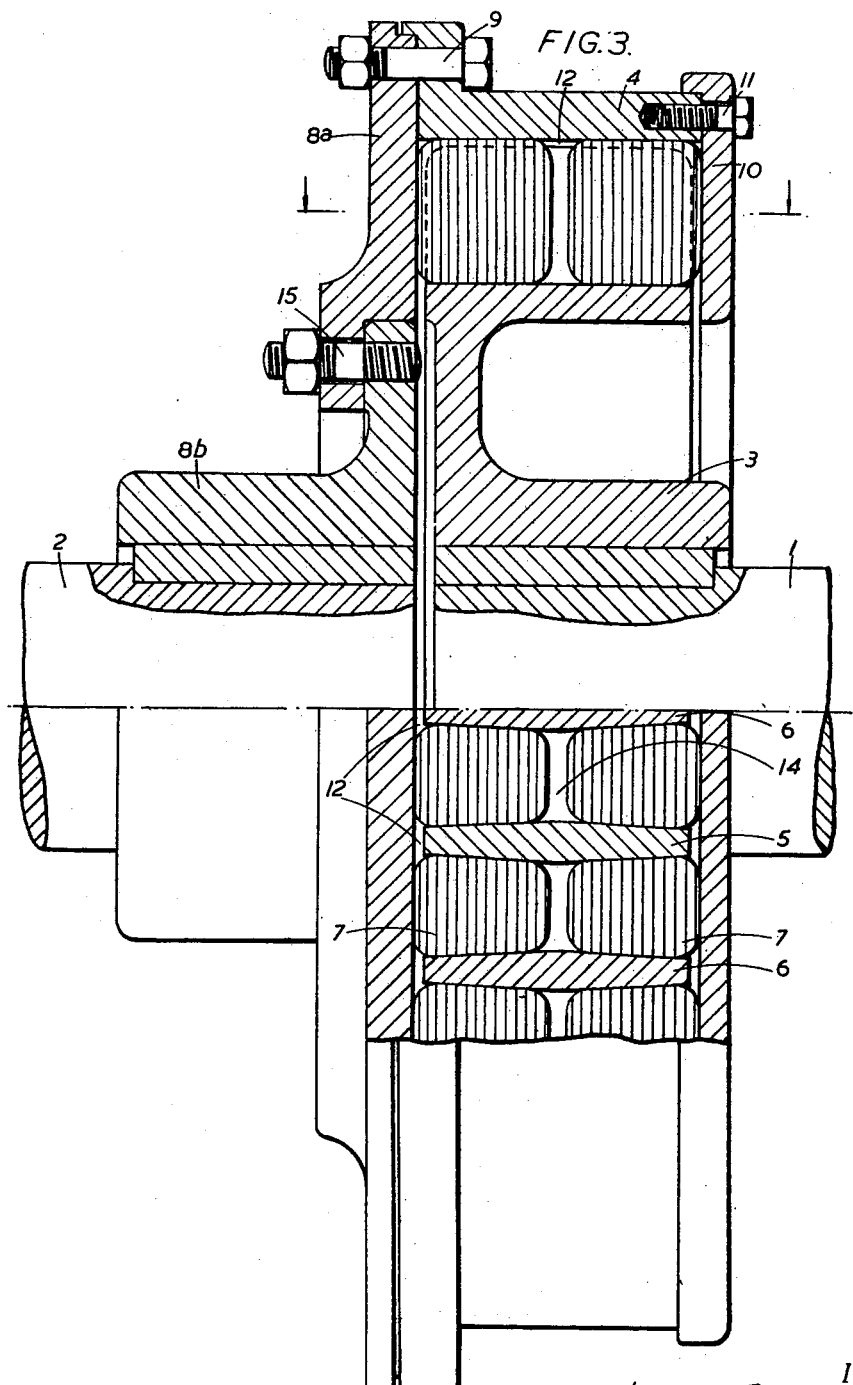
Inventor
LOUIS P. CROSET
By
Young, Emery & Thompson
Attorneys Patented Dec. 16, 1952

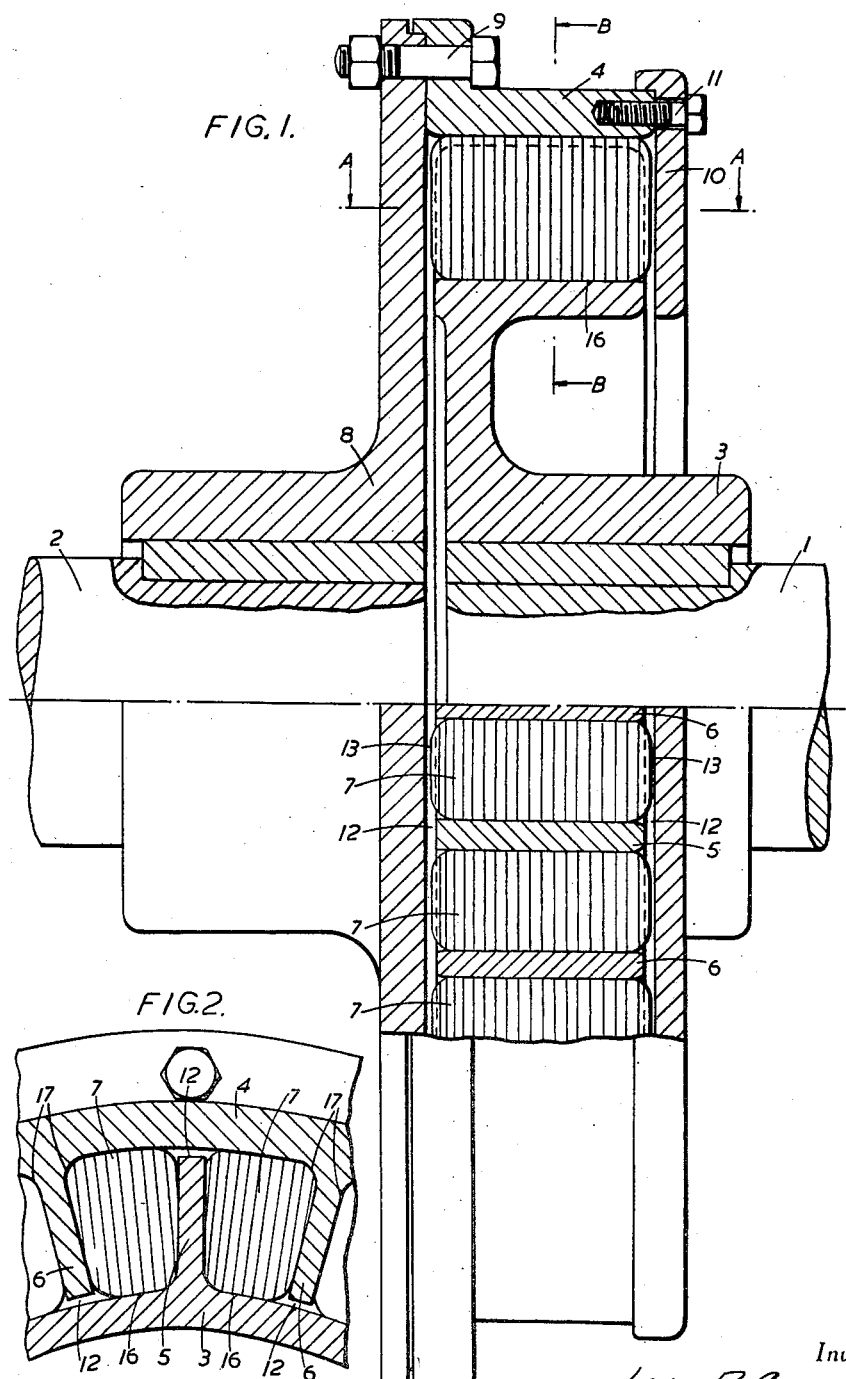

2,621,493

UNITED STATES PATENT OFFICE 2,621,493

FLEXIBLE COUPLING, DAMPER, AND THE LIKE

Louis P. Croset, Colchester, England

Application March 15, 1948, Serial No. 14,836
In Great Britain April 1, 1947

3 Claims. (Cl. 64—14)

This invention concerns improvements in flexible couplings, torsional vibration dampers, dynamic dampers (also known as detuners) and the like of the kind comprising two concentric members carrying arms or spokes which extend radially or more or less radially from the said members, are arranged alternately on one and the other member in the circumferential direction, and are each engaged by one or more pairs of elastic members so that one face of each elastic member engages an arm of one of the two concentric members and the opposite face an arm of the other concentric member. The elastic members, which are initially compressed to such extent as to prevent complete unloading thereof on either side even under the most severe conditions of torque or vibration, have usually had the form of steel compression springs in known devices of this kind.

The object of this invention is to provide an improved construction, particularly in the case of the arms and elastic members, giving increased elasticity and reliability whilst at the same time economising in material and manufacturing time and offering a wider scope of application than hitherto available.

According to this invention the radial arms of the concentric members are in the form of flat or substantially flat blades or plates (hereinafter referred to as blades) and the elastic members (which are pre-compressed when fitted as in the case of the known springs) are in the form of blocks of rubber or synthetic rubber-like material which are of wedge form or generally wedge-like, are inserted between the blades and are not bonded to metal but are free to expand axially and/or radially or otherwise deform to accommodate variations of shape under differing conditions of load; one or more of these blocks is or are fitted in each cell formed between adjacent blades. The blades may be integral with the concentric members or secured thereto in any convenient way, e. g., by electric arc or resistance welding; when welded in place accurate positioning is preferably ensured by the use of a jig. The blades are advantageously of rectangular section.

The blocks of rubber or equivalent material are formed preferably as sectors of a toroid of rectangular cross-section but with the edges rounded off. In order to obtain non-linear compression characteristics (thus obtaining better detuning and damping effects than are obtainable with steel springs) and/or to improve cooling the blocks may be hollowed, apertured or the like. Alternatively or in addition the flanks of the blocks, instead of being flat as in the case of formation as sectors of the toroid mentioned, may be given an arcuate or other shape, or they may be tapered both axially and radially.

My improved construction is reversible, i. e., either of the concentric members may be the driven member or the driving member as desired. They may be supported by independent shafts (the construction then being advantageously of dry type) or one may be placed so as to be supported by the other alone. In the latter case the outer member may be supported and centred on the edges of the blades of the inner member or may be so supported and in addition engage a circular surface of the inner member at the inner edges of its own blades (in which event lubrication is preferably employed). In these constructions the blocks may be held against axial displacement on one side by a disc supporting the outer member and on the other by a light retaining plate, of annular form, removable for insertion, inspection or renewal of the blocks. Alternatively, in a preferred damper construction, a retaining plate is used at each side and these plates locate the outer member axially.

When the two concentric members are to be supported by separate shafts they are conveniently of annular form. Each of them, for example, may be bolted to or otherwise secured to the face of a disc on one of the shafts and may be provided with a bolting flange if necessary. One of the discs may be connected to or act as a flywheel. These discs, or covers serving the same purpose, close the cells bounded at the inner and outer surfaces by the concentric members and at the circumferentially-spaced sides by the blades. As already indicated these blades may be integral with the concentric members or attached thereto preferably by welding. Of course, the concentric members may be formed integrally with the discs.

An advantageous form of flexible gear drive embodying the invention may be as follows. The one concentric member is formed as a hub adapted to be keyed to a shaft whilst the second is toothed at its outer periphery, to act as a gear wheel, and surrounds the first annularly. Discs secured to the toothed member engage the ends of the hub-member to support the toothed member and to close the cells formed between the blades of the two members.

The invention will now be more fully described by way of example with reference to the accompanying diagrammatic drawings wherein:

Figure 1 is a view of a coupling made in accordance with the invention the upper half being a radial section, and the lower half being part in section on line A—A and part elevation;

Figure 2 is a sectional view on the line B—B on Figure 1; and

Figure 3 is a view with sections similar to those of Figure 1 of a coupling having a modified construction.

Referring to Figures 1 and 2, 1 and 2 are driving and driven shafts respectively which carry concentric coupling driving and driven members 3 and 4 respectively the latter being connected to the shaft 2 by means of a disc 8 and bolts 9. The aforesaid members are provided on their outer and inner periphery respectively with substantially flat radial blades or plates 5 and 6. The members 3 and 4 are in the form of drums or cylinders and one (3) is located within and spaced from the other. The blades on the outer drum extend inwardly and alternate with the outwardly extending blades on the inner drum. Between each pair of adjacent blades is a resilient force-transmitting element or block 7 which is of wedge form or generally tapering radially with its smaller ends innermost and preferably made of natural rubber or synthetic rubber-like material. These elements are suitably pre-compressed or pre-loaded and held against excessive axial displacement on one side by the disc 8 and on the other by a retaining plate 10, or ring of annular form, removable for insertion, inspection or removal of the blocks 7. The disc 8 and plate 10 limit the deformation of the blocks to a pre-determined value which is slightly less than that of the aforesaid pre-loading in order to prevent complete unloading thereof even under the most severe torque fluctuations and it will be seen that in their fitted or equilibrium condition as shown in part section A—A of Figure 1, the blocks are free to expand endwise in spaces 13 under the influence of torque in either direction. In some cases radial expansion only of the blocks may be desired and a space therefor provided at 16 between the periphery of the driving member 3 and blocks 7 or such radial expansion may be additional to the aforesaid endwise expansion. Further, it will be seen that the radial blades 5 and 6 of the driving and driven members 3 and 4 are of rectangular section and provided with a substantial radius or fillet 17 at their base and have radial and axial clearances 12 at their extremities to permit misalignment between the driving and driven members within the limits of the said clearances.

The construction of coupling shown in Figure 3 differs from that described above in that the blades 5 and 6 and the blocks 7 are of slightly different form. As will be seen, a pair of blocks 7, 7, tapered axially and outwardly on both sides are inserted or lie between adjacent driving and driven blades which are tapered likewise, the blocks being in contact with the remaining members 8a and 10 which prevent any outward axial displacement, but have freedom to expand inwardly axially, that is to say, towards each other under the influence of torque and eventually to fill the gap 14, the deformation being limited by actual contact of one block with the other. The connection between driven member 4 and driven shaft 2 is by means of side member 8a, flanged hub 8b, bolts 9 and studs 15. The tapered blades 5 and 6 of the driving and driven members 3 and 4 respectively, may be formed integrally therewith, when accurate cast steel castings may preferably be used, or the tapered blades may be welded to the aforesaid members 3 and 4, no machining of the faces of the blades being required in either case.

Reverting to Figure 1, it is clear that instead of the one-piece block shown, two or more may be fitted in each cell formed between adjacent blades. It will be understood that a flexible shaft coupling according to this invention is reversible, that is to say that in some applications it may be found advantageous that 4 be the driving and 3 the driven member.

The blocks should be designed of such size for a given maximum loading that they will not be compressed more than twenty per cent in width during use. To achieve this without unduly increasing the diameter of the coupling we prefer to make the axial length of the blocks at least one and one-quarter times the radial dimension. The blocks, however, should not be too long as this makes it difficult to insert them under compression and the lengths of the blocks should therefore not exceed twice the radial dimension. The blocks are inserted under initial compression by making them of greater size peripherally than the normal cell dimension but of less radial dimension than the cell. The blocks are then pressed into the cells and will be compressed peripherally and will extend radially to fill the cell. The blocks are preferably made so that under maximum load some of the blocks are compressed to the maximum extent while the other blocks are still slightly compressed. The initial compression will produce about 5 to 10 per cent reduction of the size of the block peripherally and under load the blocks may be compressed a further 5 to 10 per cent in size.

I claim:

1. A flexible device comprising a driving element, a driven element, spaced apart projecting blades on the driving element, spaced apart blades on the driven element, which blades project alternately between the blades on the driving element, said alternating blades forming cells between said elements, walls substantially closing the axially opposite ends of the cells, means rigidly fixing said walls a fixed spaced distance apart, and elastic force-transmitting elements in the form of solid blocks of resilient material in said cells, each of said blocks, in the unloaded condition of the device, being under compression in the cells and in said condition being appreciably shorter axially than the axially spaced distance between said walls to provide space for axial expansion of the blocks, said blocks being also of such size that the blocks which are compressed under load will completely fill the cells and contact said walls with a linear deformation of not more than 20 per cent of their completely free condition while the blocks in the other cells are still slightly compressed, the side surfaces of said blocks being supported over the whole areas thereof by contact with said blades, said driving and driven elements providing inner and outer walls of said cells, the outer walls being at all times in contact with the radially outer surfaces of the blocks over the whole area of said surfaces, whereby no part of the blocks can be deformed more than twenty per cent linearly of its completely free condition.

2. A flexible device comprising an annular casing element having spaced apart inwardly projecting blades of constant thickness from and including their free ends to a position adjacent their attachment to the casing, a sleeve element extending within said casing element and having spaced apart outwardly projecting blades of constant thickness from and including their free ends to a position adjacent their attachment to the sleeve element, said blades on the sleeve element alternating with and spaced from the casing element blades, said alternating blades having a clearance between their free ends and the respective said elements and forming cells between said elements, end plates rigidly connected to the opposite ends of said casing element enclosing said cells, said walls being a fixed spaced distance apart axially, and elastic force-transmitting elements in the form of blocks of resilient material in said cells, each of said blocks in the unloaded condition of the device being appreciably shorter axially than the axially spaced distance between said walls to provide space for axial expansion of the blocks, said blocks being of such size that the blocks which are compressed under load will under maximum load conditions completely fill the cells while the blocks in the other cells will be slightly compressed.

3. A flexible device comprising a driving element, a driven element, a first rotary member on one of the elements having spaced apart projecting blades thereon, a second rotary member on the other element having spaced apart blades thereon which blades project alternately between the blades of first rotary member, said alternating blades being double tapered axially of the rotary members and forming cells between the said first and second rotary members, walls closing the ends of said cells which walls are spaced a fixed distance apart axially, and elastic force-transmitting elements in the form of a pair of tapered blocks in each cell, the blocks in each cell being together appreciably shorter than the axially spaced distance between said walls to provide space for axial expansion of the blocks, said blocks being of such size that the blocks which are compressed under load will under maximum load conditions completely fill the cells while the blocks in the other cells will be slightly compressed.

LOUIS P. CROSET.

REFERENCES CITED

The following references are of record in the file of this patent:

UNITED STATES PATENTS

| Number | Name | Date |
|---|---|---|
| 309,679 | Bacon | Dec. 23, 1884 |
| 472,707 | Hunt | Apr. 12, 1892 |
| 565,935 | Sperry | Aug. 18, 1896 |
| 1,572,519 | Davis | Feb. 9, 1926 |
| 1,638,947 | Masury et al. | Aug. 16, 1927 |